US012744808B2

(12) United States Patent
Hu et al.

(10) Patent No.: US 12,744,808 B2
(45) Date of Patent: Sep. 22, 2026

(54) SECURITY ASSESSMENT METHOD AND APPARATUS, ELECTRONIC DEVICE, AND READABLE STORAGE MEDIUM

(71) Applicant: VIVO MOBILE COMMUNICATION CO., LTD., Guangdong (CN)

(72) Inventors: Zhiyuan Hu, Guangdong (CN); Linghang Shi, Guangdong (CN); Dongyan Zhai, Guangdong (CN); Tao Su, Guangdong (CN); Jun Yan, Guangdong (CN); Huachen Wu, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 107 days.

(21) Appl. No.: 18/830,696

(22) Filed: Sep. 11, 2024

(65) Prior Publication Data

US 2025/0007944 A1 Jan. 2, 2025

Related U.S. Application Data

(63) Continuation of application No. PCT/CN2023/082037, filed on Mar. 17, 2023.

(30) Foreign Application Priority Data

Mar. 18, 2022 (CN) ......................... 202210273432.4

(51) Int. Cl.
*G06F 21/00* (2013.01)
*H04L 9/40* (2022.01)

(52) U.S. Cl.
CPC ........ *H04L 63/1433* (2013.01); *H04L 63/083* (2013.01); *H04L 63/20* (2013.01)

(58) Field of Classification Search
CPC ... H04L 63/1433; H04L 63/083; H04L 63/20; H04L 9/0897; H04L 9/3234;
(Continued)

(56) References Cited

U.S. PATENT DOCUMENTS 10,664,578 B2 * 5/2020 You ....................... G06F 21/604
2020/0151320 A1 * 5/2020 Li ........................... G06F 21/53
(Continued)

FOREIGN PATENT DOCUMENTS

CN 104079530 A 10/2014
CN 104125216 A 10/2014
(Continued)

OTHER PUBLICATIONS

Jang et al, "Retrofitting the Partially Privileged Mode for TEE Communication Channel Protection", IEEE Transactions on Dependable and Secure Computing, May 25, 2018.
(Continued)

*Primary Examiner* — Michael M Lee
(74) *Attorney, Agent, or Firm* — Price Heneveld LLP

(57) ABSTRACT

This application discloses a security assessment method and apparatus, an electronic device, and a readable storage medium. The security assessment method is applied to an electronic device that supports a trusted execution environment TEE and a rich execution environment REE, where the method includes: in a case that a security information query request for querying a security status of the electronic device that is sent by a server is received by the REE side, obtaining REE security status information and sending the security information query request and the REE security status information to the TEE side; obtaining target security information from the TEE side and generating comprehensive security information based on the REE security status information and the target security information, where the target
(Continued)

security information includes TEE security status information; and sending the comprehensive security information to the server.

19 Claims, 7 Drawing Sheets

(58) Field of Classification Search
CPC ......... H04L 9/3247; H04L 9/40; H04L 41/28; G06F 21/577; G06F 21/74
See application file for complete search history.

(56) References Cited

U.S. PATENT DOCUMENTS

| | | | | |
|---|---|---|---|---|
| 2020/0320206 | A1* | 10/2020 | Cammarota | G06F 21/57 |
| 2021/0044575 | A1 | 2/2021 | Kong et al. | |
| 2021/0359867 | A1* | 11/2021 | Wang | H04L 9/3263 |

FOREIGN PATENT DOCUMENTS

| | | | |
|---|---|---|---|
| CN | 109871327 | A | 6/2019 |
| CN | 111881459 | A | 11/2020 |
| CN | 112351022 | A | 2/2021 |
| CN | 113014539 | A | 6/2021 |
| CN | 113315637 | A | 8/2021 |
| CN | 113836538 | A | 12/2021 |
| CN | 114598541 | A | 6/2022 |
| EP | 3644569 | A1 | 4/2020 |
| EP | 3866385 | A1 | 8/2021 |
| WO | 2016116271 | A1 | 7/2016 |
| WO | 2020088323 | A1 | 5/2020 |
| WO | 2021168652 | A1 | 9/2021 |

OTHER PUBLICATIONS

Yang, Sui-Shan, "Research on Architecture of Secure Mobile Phones Based on TEE", Guangzhou Research Institute of China Telecom Corporation Co., Ltd., Guangzhou 510630, China, Aug. 1, 2016.

* cited by examiner

SECURITY ASSESSMENT METHOD AND APPARATUS, ELECTRONIC DEVICE, AND READABLE STORAGE MEDIUM

CROSS-REFERENCE TO RELATED APPLICATIONS

This application is a Bypass continuation application of PCT International Application No. PCT/CN2023/082037 filed on Mar. 17, 2023, which claims priority to Chinese Patent Application No. 202210273432.4, filed in China on Mar. 18, 2022, which are incorporated herein by reference in their entireties.

TECHNICAL FIELD

This application pertains to the field of communications technologies, and specifically relates to a security assessment method and apparatus, an electronic device, and a readable storage medium.

BACKGROUND

When providing services to users, a mobile application service provider performs corresponding service security risk assessments and needs to consider whether an electronic device is secure, whether user behavior is abnormal, whether an application that initiates mobile payment is trustworthy, or the like. However, security risk assessment results obtained by using a current security risk assessment solution are not accurate enough and cannot meet high service security requirements of users.

SUMMARY

Embodiments of this application are intended to provide a security assessment method and apparatus, an electronic device, and a readable storage medium.

According to a first aspect, an embodiment of this application provides a security assessment method applied to an electronic device that supports a TEE (trusted execution environment) and a REE (rich execution environment). The method includes:

- in a case that a security information query request for querying a security status of the electronic device that is sent by a server is received by the REE side, obtaining REE security status information and sending the security information query request and the REE security status information to the TEE side;
- obtaining target security information from the TEE side and generating comprehensive security information based on the REE security status information and the target security information, where the target security information includes TEE security status information; and
- sending the comprehensive security information to the server.

According to a second aspect, an embodiment of this application provides a security assessment method applied to a server, where the method includes:

- sending, to an electronic device, a security information query request for querying a security status of the electronic device;
- receiving comprehensive security information sent by the electronic device, where the comprehensive security information is obtained based on REE security status information and TEE security status information of the electronic device by the electronic device in response to the security information query request, and the comprehensive security information includes a signature generated by the electronic device by using a private key;
- verifying the signature in the comprehensive security information by using a public key paired with the private key; and
- if verification is successful, providing a target-service service to the electronic device.

According to a third aspect, an embodiment of this application provides a security assessment apparatus, applied to an electronic device that supports a trusted execution environment TEE and a rich execution environment REE, where the apparatus includes:

- a first processing module, configured to: in a case that a security information query request for querying a security status of the electronic device that is sent by a server is received by the REE side, obtain REE security status information and send the security information query request and the REE security status information to the TEE side;
- a second processing module, configured to: obtain, on the TEE side, target security information and generate comprehensive security information based on the REE security status information and the target security information, where the target security information includes TEE security status information; and
- a sending module, configured to send the comprehensive security information to the server.

According to a fourth aspect, an embodiment of this application provides a security assessment apparatus applied to an application server, where the apparatus includes:

- a query module, configured to send, to an electronic device, a security information query request for querying a security status of the electronic device;
- a first receiving module, configured to receive comprehensive security information sent by the electronic device, where the comprehensive security information is obtained based on REE security status information and TEE security status information of the electronic device by the electronic device in response to the security information query request, and the comprehensive security information includes a signature generated by the electronic device by using a private key;
- a verification module, configured to verify the signature in the comprehensive security information by using a public key paired with the private key; and
- a service module, configured to: if verification is successful, provide a target-service service to the electronic device.

According to a fifth aspect, an embodiment of this application provides an electronic device, where the electronic device includes a processor and a memory, the memory stores a program or instructions capable of running on the processor, and when the program or instructions are executed by the processor, the steps of the method according to the first aspect are implemented or the steps of the method according to the second aspect are implemented.

According to a sixth aspect, an embodiment of this application provides a readable storage medium, where a program or instructions are stored in the readable storage medium, and when the program or instructions are executed by a processor, the steps of the method according to the first aspect are implemented; or when the program or instructions are executed by a processor, the steps of the method according to the second aspect are implemented.

According to a seventh aspect, an embodiment of this application provides a chip, where the chip includes a processor and a communication interface, the communication interface is coupled to the processor, and the processor is configured to run a program or instructions to implement the method according to the first aspect or implement the method according to the second aspect.

According to an eighth aspect, an embodiment of this application provides a computer program product, where the program product is stored in a storage medium, and the program product is executed by at least one processor to implement the method according to the first aspect, or the program product is executed by at least one processor to implement the method according to the second aspect.

DESCRIPTION OF EMBODIMENTS

The following clearly describes the technical solutions in the embodiments of this application with reference to the accompanying drawings in the embodiments of this application. Apparently, the described embodiments are only some rather than all of the embodiments of this application. All other embodiments obtained by persons of ordinary skill in the art based on the embodiments of this application shall fall within the protection scope of this application.

In the specification and claims of this application, the terms such as "first" and "second" are intended to distinguish between similar objects but do not necessarily indicate a specific order or sequence. It should be understood that the data used in this way is interchangeable in appropriate circumstances so that the embodiments of this application can be implemented in other orders than the order illustrated or described herein, and "first" and "second" are usually for distinguishing same-type objects but not limiting the number of objects, for example, there may be one or more first objects. In addition, "and/or" in this specification and claims indicates at least one of connected objects, and the symbol "/" generally indicates that the associated objects are in an "or" relationship.

The following describes in detail a security assessment method and apparatus, an electronic device, and a readable storage medium provided in the embodiments of this application by using specific embodiments and application scenarios thereof with reference to the accompanying drawings.

Figure 1:
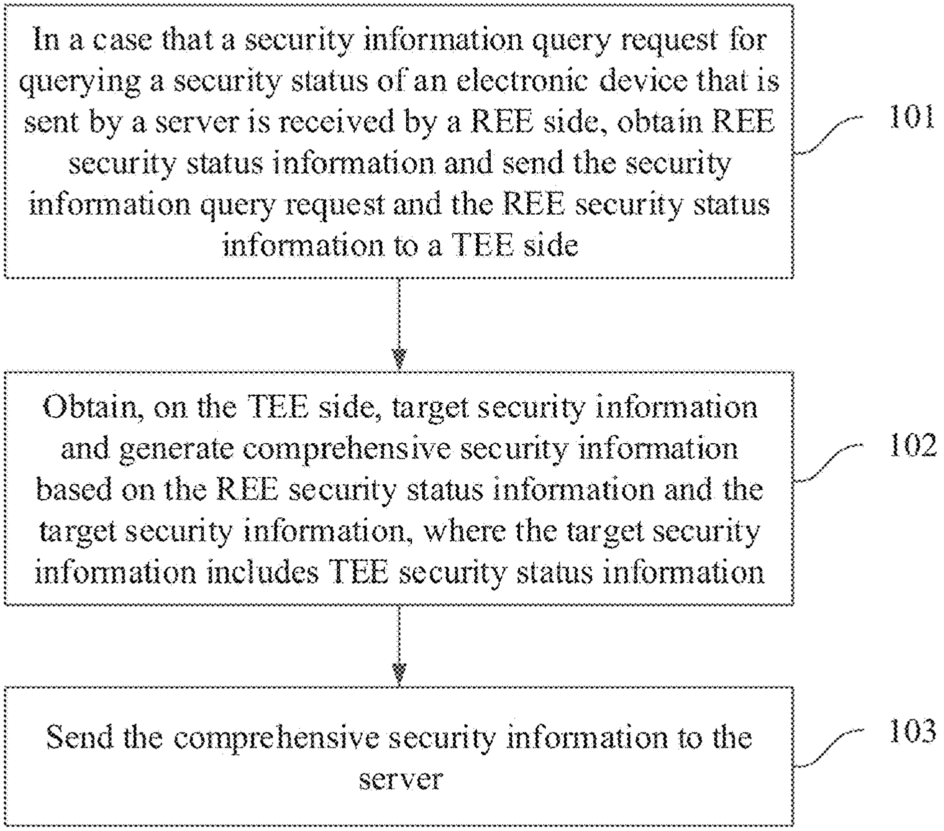
FIG. 1 is a schematic flowchart of a security assessment method according to an embodiment of this application.

Referring to FIG. 1, FIG. 1 is a schematic flowchart of a security assessment method according to an embodiment of this application. As shown in FIG. 1, one embodiment of this application provides a security assessment method applicable to an electronic device that supports a trusted execution environment TEE and a rich execution environment REE. The method includes the following steps.

Step 101: In a case that a security information query request for querying a security status of the electronic device that is sent by a server is received by the REE side, obtain REE security status information and send the security information query request and the REE security status information to the TEE side.

In this embodiment of this application, optionally, a rich execution environment operating system runs in the REE (rich execution environment), and a trusted execution environment operating system runs in the TEE (trusted execution environment).

In this embodiment, optionally, the server may be an application server. When a querying party is an application server, a transmission security mechanism between the application server and the local electronic device can use a TLS (transport layer protocol) to improve transmission security. The application server may be an application server providing services with high security requirements, such as payment services.

In a case that the REE side receives a security information query request sent by the server, REE security detection may be performed to collect REE security status information. The REE security status information may include whether there is malware, whether a system has virus, and whether a network connection is secure.

In some embodiments, optionally, the REE security status information may be collected by using a REE security detection module and a REE API (application programming interface) in the REE.

In this embodiment, optionally, there is a communication agent agreed between the REE and the TEE, with a communication/data transmission channel established. Therefore, the REE side may send the security information query request and the REE security status information to the TEE side through the transmission channel.

In some embodiments of this application, optionally, in addition to the server, a user may alternatively initiate a security information query request for querying the security status of the electronic device to meet the user's own needs for querying the security status of the electronic device.

Step 102: Obtain, on the TEE side, target security information and generate comprehensive security information based on the REE security status information and the target security information, where the target security information includes TEE security status information.

After the security information query request sent by the REE side is received, the target security information may be collected in response to the security information query request, where the target security information may include TEE security status information, and the TEE security status information may include whether there is malware, whether the system has virus, whether kernel configuration has been tampered with, whether there are execution operations in a data region on a stack, or the like.

In some embodiments, optionally, the target security information may be collected by using a TEE security detection module and a trusted internal API (application programming interface) in the TEE.

Step 103: Send the comprehensive security information to the server.

In this step, after the TEE side obtains the comprehensive security information, the TEE side may return the comprehensive security information to the REE side, and the REE side sends the comprehensive security information to the server.

In some embodiments, optionally, when the querying party is a user, the comprehensive security information may be sent to an application programming interface where the user initiates the security information query request, for display, so as to present a query result to the user. When the querying party is an application server, the comprehensive security information may be sent to the corresponding application server, and the transmission security mechanism may use the TLS protocol.

Therefore, in this embodiment of this application, the REE security status information is collected on the REE side and the target security information is collected on the TEE side. The REE security status information and the target security information can be used to implement a comprehensive assessment on the security status of the electronic device, so that the security assessment result is more accurate. In addition, the system security is enhanced because the comprehensive security information is generated in the TEE environment.

In some embodiments of this application, in a case that the security information query request includes an identifier of a client application program, before the obtaining target security information, the method further includes:

verifying, on the TEE side based on the identifier of the client application program, whether the client application program has query permission; and the obtaining target security information includes:

obtaining the target security information if the client application program has query permission.

In this embodiment, optionally, if the querying party is a user, the security information query request includes only the identifier of the client application program, that is, the user initiates a security information query request through the client application program. In this case, after the TEE side receives the security information query request and before the target security information is collected, the identifier of the client application program needs to be verified on the TEE side to verify whether the client application program has query permission. If a verification result is that the client application program has query permission, the target security information is then collected; or if the verification result is that the client application program has no query permission, a related operation is terminated and an error message is returned. This can improve system security performance.

In some embodiments of this application, in a case that the security information query request includes an identifier of a client application program and an authorization token, before the obtaining target security information, the method further includes:

verifying, on the TEE side based on the identifier of the client application program, whether the client application program has query permission, and verifying, on the TEE side, whether the authorization token is valid; and the obtaining target security information includes:

obtaining the target security information if the client application program has query permission and the authorization token is valid.

In this embodiment, optionally, if the querying party is an application server, the security information query request includes the identifier of the client application program and the authorization token of the application server, that is, the application server initiates a security information query request through the client application program. In this case, after the TEE side receives the security information query request and before the target security information is collected, the TEE side needs to verify the identifier of the client application program and the authorization token of the application server to verify whether the client application program has query permission, whether the application server has query permission, and whether an authorization time limit of the authorization token has expired. If a verification result is that the client application program has query permission and the authorization token is valid, the target security information is then collected; or if the verification result is that the client application program has no query permission or the authorization token is invalid, a related operation is terminated and an error message is returned, and the application server will be prompted to reapply for an authorization token. This can improve system security performance.

In some embodiments of this application, the generating comprehensive security information based on the REE security status information and the target security information includes:

generating a security status assessment result of the electronic device based on the REE security status information and the TEE security status information; and generating the comprehensive security information based on the security status assessment result.

In this embodiment, the collected target security information includes TEE security status information. During generation of the comprehensive security information based on the REE security status information and the target security information, a security status assessment result of the electronic device may be generated based on the REE security status information and the TEE security status information. The obtained security status assessment result is not only for assessing a REE security status but also for assessing a TEE security status, so that the security status assessment result can fully reflect the current security status of the electronic device and the security status assessment result is more accurate and reliable.

In some embodiments of this application, the TEE side stores a security status assessment model, and the generating a security status assessment result of the electronic device based on the REE security status information and the TEE security status information includes:

performing security status assessment on the REE security status information and the TEE security status information by using the security status assessment model, and generating the security status assessment result of the electronic device.

In this embodiment, optionally, a security status assessment model is stored in the TEE, and the security status assessment model is used to assess the current security status of the electronic device. Specifically, the collected REE security status information and TEE security status information may be used as input to the security status assessment model, and analysis processing is performed according to a corresponding security status assessment policy to generate a current security status assessment result of the electronic device. Therefore, with the model-based analysis and assessment method, accuracy of the security status assessment results can be effectively improved, and the security status assessment model can be continuously optimized through learning. As the number of assessments increases, the security status assessment results also become more accurate.

In some embodiments of this application, optionally, the security status assessment result is a score, that is, the security status assessment result is expressed in the form of score. Optionally, the score is positively correlated with security of the electronic device. For example, a score range of the security status assessment result is 0 to 10, 0 indicating the lowest security and 10 indicating the highest security, thus providing a more accurate security assessment basis for security risk assessment of various application services.

In some embodiments of this application, the method further includes:

in a case that security capability configuration information sent by a target server is received, performing configuration updating on a security capability of the electronic device according to the security capability configuration information; or in a case that security status assessment model configuration information sent by a target server is received, performing configuration updating on a security status assessment model of the electronic device according to the security status assessment model configuration information.

In this embodiment, the target server is an electronic device management server, which is used to manage the local electronic device. For example, the local electronic device may receive security status assessment model configuration information sent by the target server. The security status assessment model configuration information is used to update and adjust parameters and assessment policies in the security status assessment model. Therefore, the electronic device may perform configuration updating on the security status assessment model in the TEE according to the received security status assessment model configuration information, so as to make security status assessment results generated by the security status assessment model more accurate. Alternatively, the local electronic device may receive security capability configuration information sent by the target server. The security capability configuration information is used to update and adjust a security capability of the electronic device. Therefore, the electronic device may perform configuration updating on the security capability of the electronic device itself according to the received security capability configuration information, so as to improve the security performance of the system.

In some embodiments of this application, the target security information further includes security capability information of the electronic device. In other words, the target security information not only includes TEE security status information, but also includes the security capability information of the electronic device. Through integration of the current security status information of the electronic device and the security capability information of the electronic device, a security status of the electronic device can be more comprehensively assessed, so as to provide fine-grained security performance assessment for the electronic device and provide a more accurate security assessment basis for security risk assessment of various application service. In some embodiments, optionally, the security capability information of the electronic device includes at least one of trusted execution environment, trusted user interaction, hardware encryption and decryption, security unit, memory encryption, anti-side channel attack, and anti-fault injection attack.

In some other embodiments of this application, the generating the comprehensive security information based on the security status assessment result includes:

performing digital signature on the security capability information and the security status assessment result by using a private key of the electronic device; and generating the comprehensive security information based on the security capability information, the security status assessment result, and a signature.

After the security capability information of the electronic device and the security status assessment result are obtained, in order to avoid a delay caused by signature made on the security assessment result by the server each time during security assessment in related technologies, the TEE of the local electronic device performs digital signature on the security capability information and the security status assessment result by using the private key of the electronic device, thereby improving security performance while reducing delay and improving system performance. Optionally, the server has a public key paired with the private key of the electronic device, and may use the public key to verify the comprehensive security information returned by the electronic device, so as to determine their authenticity and integrity.

In some embodiments of this application, the REE security status information and the TEE security status information may each include at least one of the following: application access control information, file system access control information, data encryption information, data integrity protection information, security lock screen and authentication information, integrity verification information of device configuration files, whether there is malware or virus in a system, whether configuration of hardware and firmware has been tampered with, whether a system software version meets requirements, whether the system is rooted, whether a memory has been attacked, whether a kernel and kernel configuration have been tampered with, and whether a network connection is secure. The foregoing information may be detected by the security detection modules on the REE side and TEE side. Through incorporation of more security status information into security status assessment, the requirements of some application programs for high security performance can be met. In this way, the security status of the electronic device can be more comprehensively assessed, thus providing fine-grained security performance assessment for the electronic device and providing a more accurate security assessment basis for security risk assessment of various application services.

In summary, in this embodiment of this application, the REE security status information is collected on the REE side and the target security information is collected on the TEE side. The REE security status information and the target security information can be used to implement a comprehensive assessment on the security status of the electronic device, so that the security assessment result is more accurate. In addition, the system security is enhanced because the comprehensive security information is generated in the TEE environment.

Figure 2:
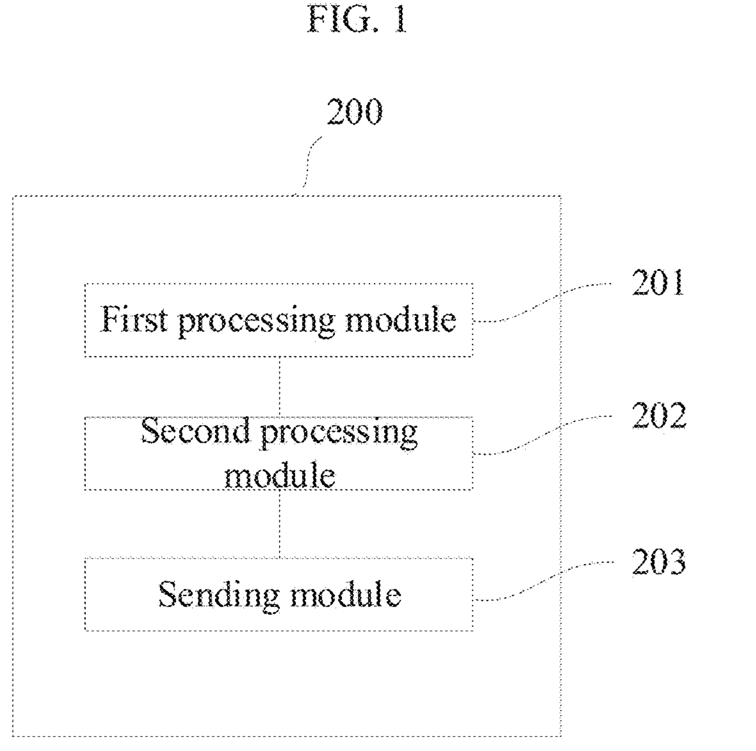
FIG. 2 is a schematic structural diagram of a security assessment apparatus according to an embodiment of this application.

Referring to FIG. 2, FIG. 2 is a schematic structural diagram of a security assessment apparatus according to an embodiment of this application. As shown in FIG. 2, another embodiment of this application further provides a security assessment apparatus, applied to an electronic device that supports a trusted execution environment TEE and a rich execution environment REE, where the apparatus 200 includes:

a first processing module 201, configured to: in a case that a security information query request for querying a security status of the electronic device that is sent by a server is received by the REE side, obtain REE security status information and send the security information query request and the REE security status information to the TEE side;

a second processing module 202, configured to: obtain, on the TEE side, target security information and generate comprehensive security information based on the REE security status information and the target security information, where the target security information includes TEE security status information; and a sending module 203, configured to send the comprehensive security information to the server.

Optionally, in a case that the security information query request includes an identifier of a client application program, the apparatus 200 further includes:

a first verification module, configured to verify, on the TEE side based on the identifier of the client application program, whether the client application program has query permission; and the second processing module 202 includes:

a first obtaining unit, configured to obtain the target security information if the client application program has query permission.

Optionally, in a case that the security information query request includes an identifier of a client application program and an authorization token, the apparatus 200 further includes:

a second verification module, configured to: verify, on the TEE side based on the identifier of the client application program, whether the client application program has query permission, and verify, on the TEE side, whether the authorization token is valid; and the second processing module 202 includes:

a second obtaining unit, configured to obtain the target security information if the client application program has query permission and the authorization token is valid.

Optionally, the second processing module 202 includes:

a first generating unit, configured to generate a security status assessment result of the electronic device based on the REE security status information and the TEE security status information; and a second generating unit, configured to generate the comprehensive security information based on the security status assessment result.

Optionally, the target security information further includes security capability information of the electronic device, and the second generating unit includes:

a signature subunit, configured to perform digital signature on the security capability information and the security status assessment result by using a private key of the electronic device; and a generating subunit, configured to generate the comprehensive security information based on the security capability information, the security status assessment result, and a signature.

Optionally, the TEE side stores a security status assessment model, and the first generating unit includes:

an assessment subunit, configured to: perform security status assessment on the REE security status information and the TEE security status information by using the security status assessment model, and generate the security status assessment result of the electronic device.

Optionally, the apparatus 200 further includes:

a first update module, configured to: in a case that security capability configuration information sent by a target server is received, perform configuration updating on a security capability of the electronic device according to the security capability configuration information; or a second update module, configured to: in a case that security status assessment model configuration information sent by a target server is received, perform configuration updating on a security status assessment model of the electronic device according to the security status assessment model configuration information.

Optionally, the security capability information includes at least one of the following: trusted execution environment information, trusted user interaction information, hardware encryption and decryption information, security unit information, memory encryption information, anti-side channel attack information, and anti-fault injection attack information.

Optionally, the REE security status information and the TEE security status information each include at least one of the following: application access control information, file system access control information, data encryption information, data integrity protection information, security lock screen and authentication information, integrity verification information of device configuration files, whether there is malware or virus in a system, whether configuration of hardware and firmware has been tampered with, whether a system software version meets requirements, whether the system is rooted, whether a memory has been attacked, whether a kernel and kernel configuration have been tampered with, and whether a network connection is secure.

In this embodiment of this application, the REE security status information is collected on the REE side and the target security information is collected on the TEE side. The REE security status information and the target security information can be used to implement a comprehensive assessment on the security status of the electronic device, so that the security assessment result is more accurate. In addition, the system security is enhanced because the comprehensive security information is generated in the TEE environment.

The security assessment apparatus in this embodiment of this application may be an electronic device, or may be a component in the electronic device, such as an integrated circuit or a chip. The electronic device may be a terminal or other devices than the terminal. For example, the electronic device may be a mobile phone, a tablet computer, a notebook computer, a palmtop computer, an in-vehicle electronic device, a mobile Internet device (MID), an augmented reality (AR)/virtual reality (VR) device, a robot, a wearable device, an ultra-mobile personal computer (UMPC), a netbook, a personal digital assistant (PDA), or the like; or may be a network-attached storage (NAS), a personal computer (PC), a television (TV), a teller machine, a self-service machine, or the like. This is not specifically limited in the embodiments of this application.

The security assessment apparatus in this embodiment of this application may be an apparatus with an operating system. The operating system may be an Android operating system, an iOS operating system, or other possible operating systems, and is not specifically limited in the embodiments of this application.

The security assessment apparatus provided in this embodiment of this application is capable of implementing the processes that are implemented by the method embodiments in FIG. 1. To avoid repetition, details are not described herein again.

Figure 3:
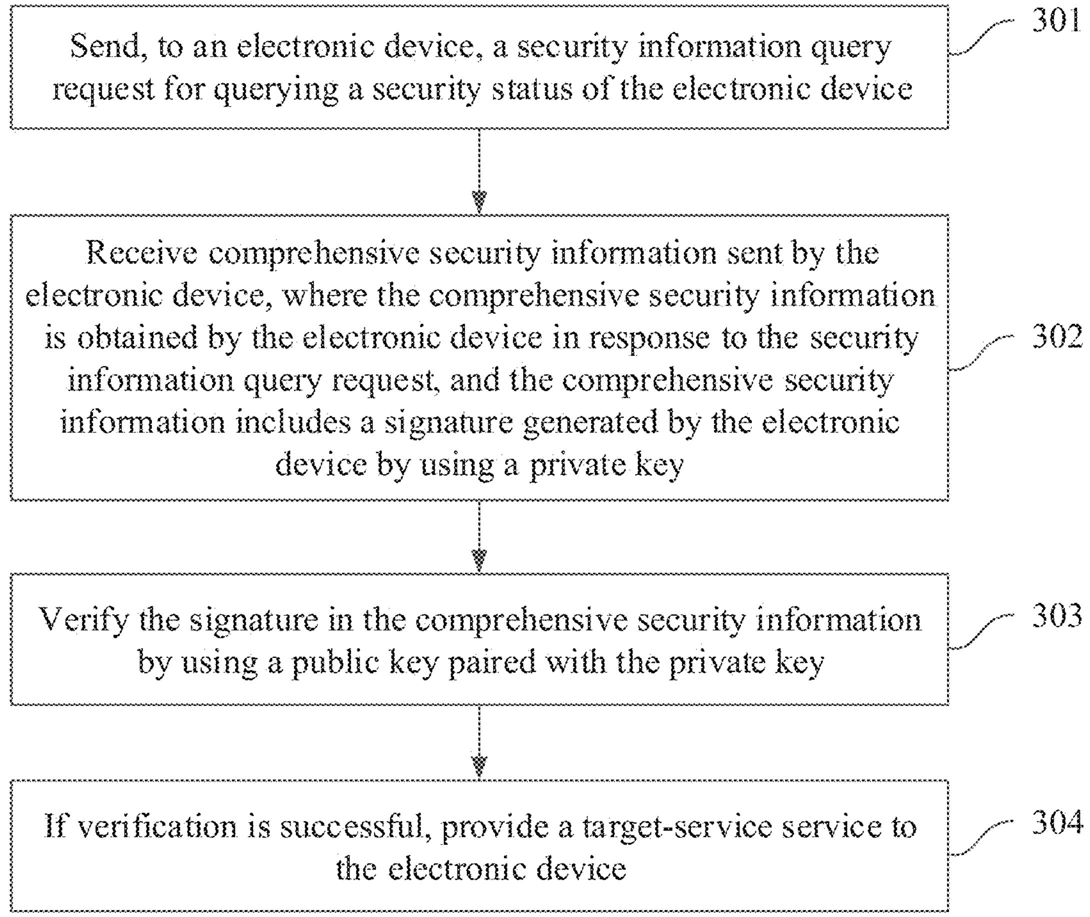
FIG. 3 is a schematic flowchart of another security assessment method according to an embodiment of this application.

Referring to FIG. 3, FIG. 3 is a schematic flowchart of another security assessment method according to an embodiment of this application. As shown in FIG. 3, another embodiment of this application further provides a security assessment method, applied to a server. The method includes the following steps.

Step 301: Send, to an electronic device, a security information query request for querying a security status of the electronic device.

Step 302: Receive comprehensive security information sent by the electronic device, where the comprehensive security information is obtained based on REE security status information and TEE security status information of the electronic device by the electronic device in response to the security information query request, and the comprehensive security information includes a signature generated by the electronic device by using a private key.

Step 303: Verify the signature in the comprehensive security information by using a public key paired with the private key.

Step 304: If verification is successful, provide a target-service service to the electronic device.

In this embodiment of this application, the comprehensive security information generated after the electronic device receives the security information query request is digitally signed by using the private key of the electronic device, so that the application server can use the public key paired with the private key to verify authenticity and integrity of the comprehensive security information that is fed back, thereby enhancing the system security. Only after the verification is successful, the electronic device is authorized to provide the target-service service, thereby improving security of related services.

In this embodiment, for the process of obtaining the comprehensive security information by the electronic device in response to the security information query request, refer to the embodiment of the security assessment method applied to the electronic device, which is not described again herein.

For the security assessment method provided in the embodiments of this application, the execution subject may be a security assessment apparatus. In the embodiments of this application, the security assessment method being performed by the security assessment apparatus is used as an example to describe the security assessment apparatus provided in the embodiments of this application.

Figure 4:
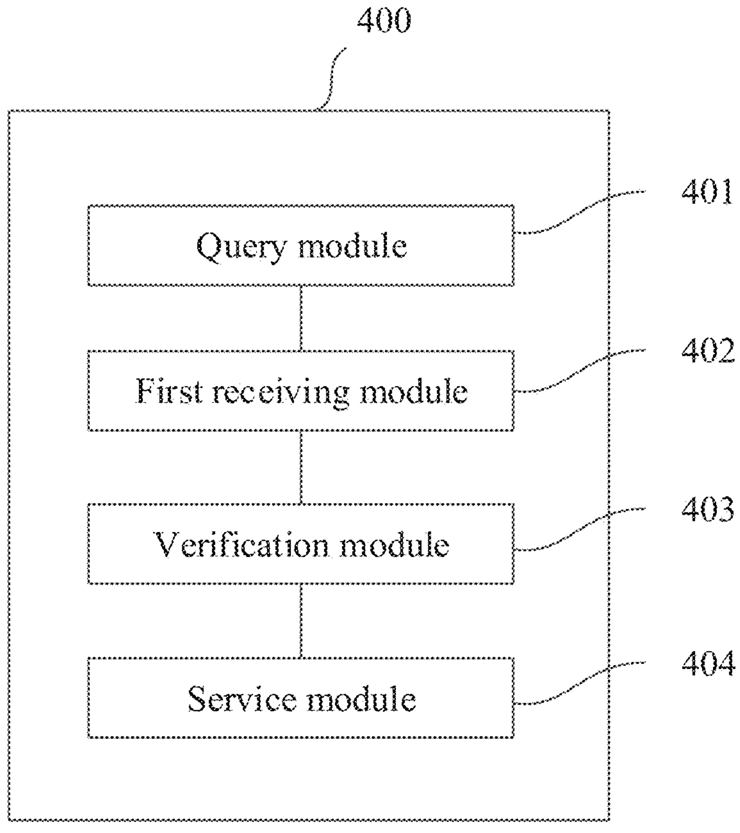
FIG. 4 is a schematic structural diagram of another security assessment apparatus according to an embodiment of this application.

Referring to FIG. 4, FIG. 4 is a schematic structural diagram of another security assessment apparatus according to an embodiment of this application. As shown in FIG. 4, still another embodiment of this application provides a security assessment apparatus, applied to a server. The apparatus 400 includes:

- a query module 401, configured to send, to an electronic device, a security information query request for querying a security status of the electronic device;
- a first receiving module 402, configured to receive comprehensive security information sent by the electronic device, where the comprehensive security information is obtained based on REE security status information and TEE security status information of the electronic device by the electronic device in response to the security information query request, and the comprehensive security information includes a signature generated by the electronic device by using a private key;
- a verification module 403, configured to verify the signature in the comprehensive security information by using a public key paired with the private key; and
- a service module 404, configured to: if verification is successful, provide a target-service service to the electronic device.

In this embodiment of this application, the comprehensive security information generated after the electronic device receives the security information query request is digitally signed by using the private key of the electronic device, so that the application server can use the public key paired with the private key to verify authenticity and integrity of the comprehensive security information that is fed back, thereby enhancing the system security.

The security assessment apparatus in this embodiment of this application may be a server or the like, which is not specifically limited in the embodiments of this application.

The security assessment apparatus in this embodiment of this application may be an apparatus with an operating system. The operating system may be an Android operating system, an iOS operating system, or other possible operating systems, and is not specifically limited in the embodiments of this application.

The security assessment apparatus provided in this embodiment of this application is capable of implementing the processes that are implemented by the method embodiments in FIG. 3. To avoid repetition, details are not described herein again.

Figure 5:
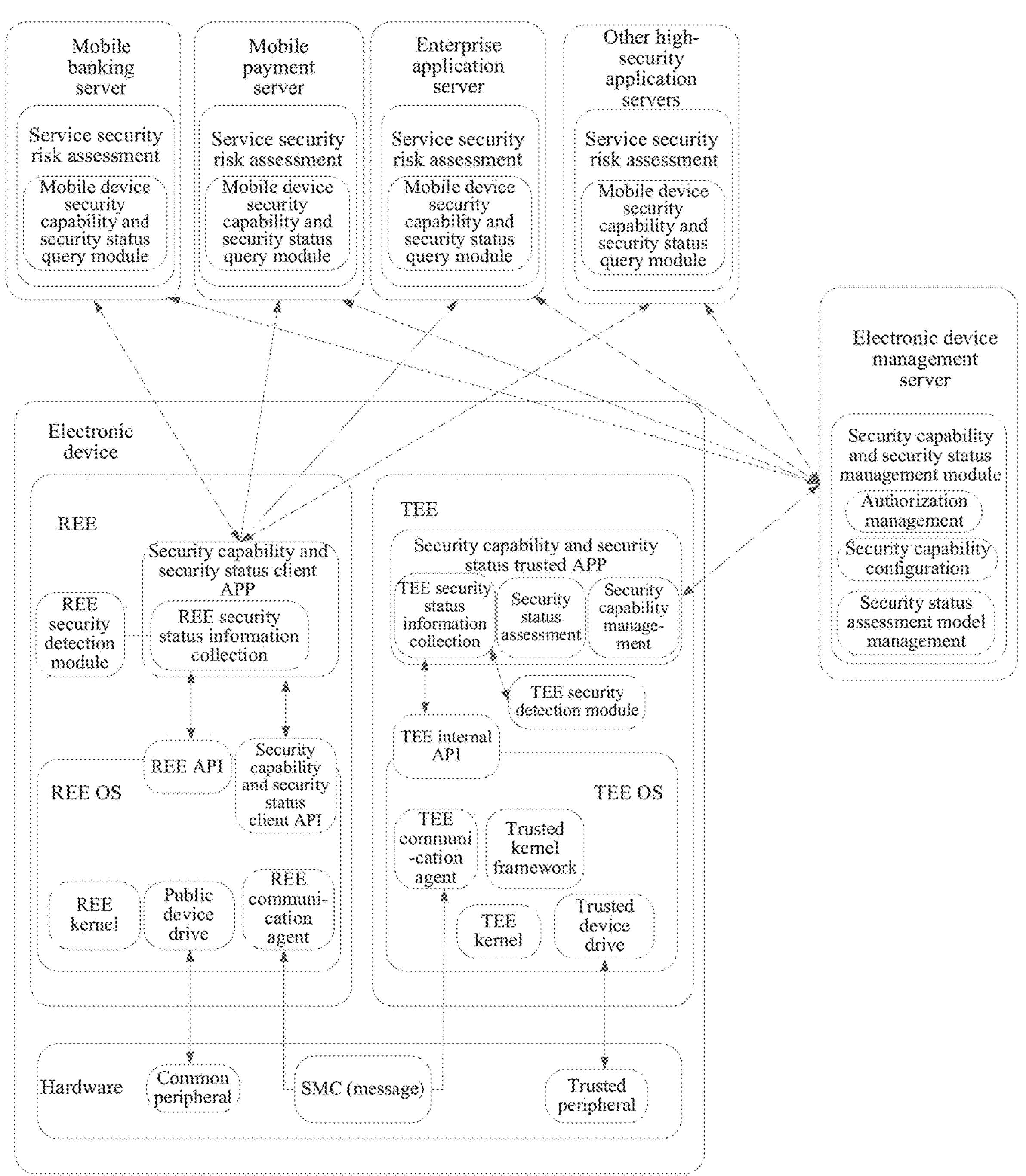
FIG. 5 is a schematic structural diagram of an electronic device supporting a TEE and a REE according to an embodiment of this application.

Referring to FIG. 5, FIG. 5 is a schematic structural diagram of an electronic device supporting a TEE and a REE according to an embodiment of this application. As shown in FIG. 5, in this embodiment of this application, a querying party may be a mobile banking server, a mobile payment server, an enterprise application server, another high-security application server, or the like. The electronic device supports a trusted execution environment TEE and a rich execution environment REE. A rich execution environment operating system REE OS runs in the REE, and a trusted execution environment operating system TEE OS runs in the TEE.

Functions of each part of the electronic device are described below with reference to the accompanying drawings.

REE side a) Security capability and security status client APP:

Receiving a request for security capability query and current security status assessment from a user or "an electronic device security capability and security status query module" of an application server; where the request includes an identifier of a "security capability and security status client APP" and an authorization token of the application server;

- if the request comes from a query about the electronic device by the user, the request includes only the identifier of the "security capability and security status client APP";
- collecting security status information on the REE side (for example, whether there is malware, whether the system has virus, or whether a network connection is secure) by using the "REE security detection module" and "REE API";
- initiating a call request for security capability query and a current security status assessment to the "security capability and security status client API"; where the request includes an identifier of the "security capability and security status client APP", the authorization token of the application server, and the REE security status information;

receiving a corresponding response (including the security capability information, a current security status assessment result, the signature of the electronic device, and the like) from the "security capability and security status client API"; where the security capability mainly includes: trusted execution environment, trusted user interaction, hardware encryption and decryption, security unit, memory encryption, anti-side channel attack, anti-fault injection attack, and the like; and the current security status assessment result is one score (such as 0 to 10, 0 indicating the lowest security and 10 indicating the highest security); and in addition to security features of the Android operating system (such as application access control, file system access control, data encryption, data integrity protection, security lock screen and authentication, or integrity verification of device configuration files), factors for the current security status assessment mainly further include: whether there is malware or virus in the system, whether configuration of hardware and firmware has been tampered with, whether a system software version meets requirements, whether the system is rooted, whether a memory is attacked, whether a kernel and kernel configuration are tampered with, whether a network connection is secure enough, or the like;

returning the received security capability information, current security status assessment result, and signature of the electronic device to the "electronic device security capability and security status query module" of the application server; and presenting the security capability and current security status of the electronic device to the user.

b) Security capability and security status client API:

receiving a request for security capability query and current security status assessment from the "security capability and security status client APP" of the electronic device; where the request includes an identifier of the "security capability and security status client APP", the authorization token of the application server, and the REE security status information;

through a communication agent on the REE side and a communication agent on the TEE side, initiating a call request to a "security capability and security status trusted App" on the TEE side, where the request includes an identifier of the "security capability and security status client APP" and the authorization token of the application server, and the REE security status information;

receiving a corresponding response (including the security capability information, a current security status assessment result, the signature of the electronic device, and the like) from the "security capability and security status trusted App" on the TEE side; and returning the received security capability information of the electronic device, current security status assessment result, and signature of the electronic device to the "security capability and security status client APP" of the electronic device.

TEE side a) Security capability and security status trusted APP:

receiving a request for security capability query and current security status assessment from the "security capability and security status client API" on the REE side of the electronic device; where the request includes an identifier of the "security capability and security status client APP", the authorization token of the application server, and the REE security status information; and checking, according to a corresponding security policy, whether the access request is valid:

based on the identifier of the "security capability and security status client APP" of the electronic device, checking whether the application has permission to call the "security capability and security status trusted APP";

verifying validity of the authorization token of the application server (for example, whether the token comes from the electronic device management server, or whether the token has expired), and checking whether the server has permission to call the "security capability and security status trusted APP";

collecting security status information (for example, whether there is malware, whether the system has virus, whether a kernel configuration is tampered with, or whether there are execution operations in a data region on a stack) on the TEE side by using the "TEE security detection module" and "trusted internal API";

performing real-time assessment on the security status of the electronic device through the "security status assessment" module based on the received REE security status information and TEE security status information by using the security status assessment model or method, to obtain one current security status assessment result;

determining, according to the security capability query request through the "security capability management" module, security capability information that needs to be returned;

performing digital signature on the security capability information and the current security status assessment result by using a private key of the electronic device;

through the communication agent on the REE side and the communication agent on the TEE side, returning the security capability information of the electronic device, the current security status assessment result, and the signature of the electronic device to the "security capability and security status client API" on the REE side of the electronic device;

receiving configurations and updates of "security capability management" from the "security capability configuration" of the electronic device management server; and receiving configurations and updates of the "security status assessment" from the "security status assessment model management" of the electronic device management server.

In the electronic device management server:

Terminal security capability and security status management module a) Authorization management Receiving an authorization request for electronic device security capability query and security status assessment from the "electronic device security capability and security status query module" in the application server;

authenticating the application server or the "electronic device security capability and security status query module" of the application server;

generating one authorization token for the "electronic device security capability and security status query module" of the application server; and returning the authorization token to the "electronic device security capability and security status query module" of the application server.

b) Security capability configuration

Configuring and updating the security capability in the "security capability management" of the electronic device.

c) Security status assessment model management

Configuring and updating the security status assessment model and security assessment policy in the "security status assessment" of the electronic device; and enhancing the security status assessment model.

In the service security risk assessment of the application server (mobile banking, mobile payment, enterprise application, and the like):

Electronic device security capability and security status query module a) Initiating a security capability query and current security status assessment call to the "security capability and security status API" of the electronic device.

b) Receiving a corresponding response (that is, the security capability information of the electronic device, the security status assessment result, and the signature of the electronic device) from the "security capability and security status API" of the electronic device, and verify authenticity and integrity of the response based on the public key of the application server.

Figure 6:
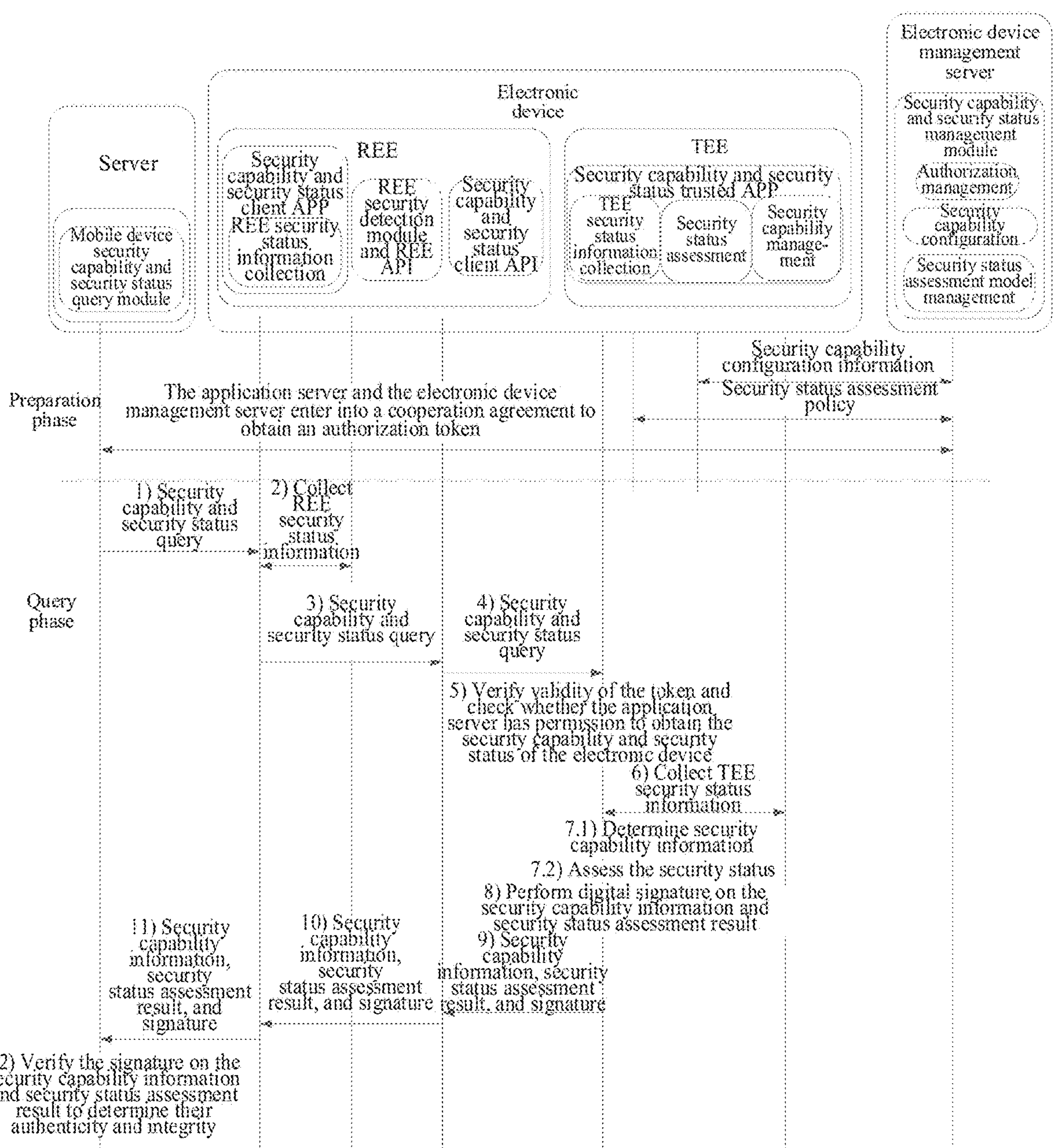
FIG. 6 is a schematic flowchart of still another security assessment method according to an embodiment of this application.

Referring to FIG. 6, FIG. 6 is a schematic flowchart of still another security assessment method according to an embodiment of this application. As shown in FIG. 6, in the security assessment method in this embodiment of this application:

A query phase includes the following steps:

1) An "electronic device security capability and security status query module" of an application server initiates a request for security capability query and current security status assessment (including an authorization token) to a "security capability and security status client APP" on a REE side of an electronic device; where a transmission security mechanism of a request message may use a TLS.

2) The "security capability and security status client APP" on the REE side of the electronic device collects REE security status information through a "REE security detection module" and "REE API".

3) The "security capability and security status client APP" on the REE side of the electronic device sends a security capability query and security status assessment request (including the authorization token and the REE security status information) to a "security capability and security status client API" on the REE side of the electronic device.

4) The "security capability and security status client API" on the REE side of the electronic device sends the received security capability query and security status assessment request (including the authorization token and the REE security status information) to the "security capability and security status trusted APP" on the TEE side through the REE communication agent and the TEE communication agent.

5) The "security capability and security status trusted APP" on the TEE side verifies validity of the authorization token, and checks whether the application server has permission to obtain the security capability and security status of the electronic device; and if verification of the authorization token fails, a related operation is terminated and an error message is returned, and the application server is then prompted to reapply for an authorization token.

6) The "security capability and security status trusted APP" on the TEE side collects TEE security status information through the "TEE security detection module" and "trusted internal API".

7) The "security capability and security status trusted APP" on the TEE side determines the security capability information of the electronic device and assesses the current security status.

7.1) Determine the security capability information of the electronic device through the "security capability management" module.

7.2) Assess the current security status of the electronic device through the "security status assessment" module based on both the REE security status information and the TEE security status information.

8) The "security capability and security status trusted APP" on the TEE side uses the private key of the electronic device to perform digital signature on the security capability information and security status assessment result.

9) The "security capability and security status trusted APP" on the TEE side returns the security capability information, the security status assessment result, and the signature to the "security capability and security status client API" on the REE side through the TEE communication agent and REE communication agent.

10) The "security capability and security status client API" on the REE side returns the received security capability information, security status assessment result, and signature to the "security capability and security status client APP" on the REE side.

11) The "security capability and security status client APP" on the REE side returns the received security capability information, security status assessment result, and signature to the "electronic device security capability and security status query module" of the application server; where the transmission security mechanism of the returned message may use the TLS.

12) The "electronic device security capability and security status query module" of the application server uses the public key of the electronic device to verify the signature of the security capability information and security status assessment result, so as to determine their authenticity and integrity.

In this embodiment of this application, the REE security status information is collected on the REE side and the target security information is collected on the TEE side. The REE security status information and the target security information can be used to implement a comprehensive assessment on the security status of the electronic device, so that the security assessment result is more accurate. In addition, the system security is enhanced because the comprehensive security information is generated in the TEE environment.

Figure 7:
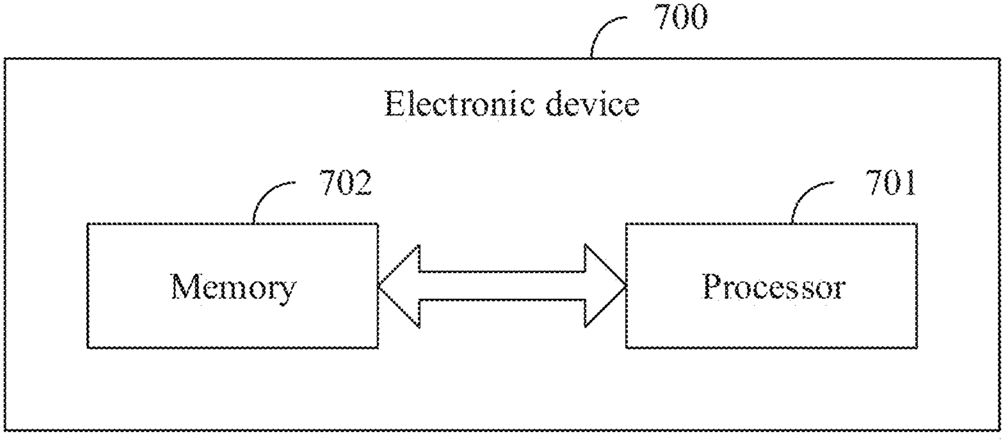
FIG. 7 is a schematic structural diagram of an electronic device according to an embodiment of this application.

Optionally, as shown in FIG. 7, an embodiment of this application further provides an electronic device 700, including a processor 701 and a memory 702. The memory 702 stores a program or instructions capable of running on the processor 701. When the program or instructions are executed by the processor 701, the steps of the foregoing embodiments of the security assessment method are implemented, with the same technical effects achieved. To avoid repetition, details are not described herein again.

Figure 8:
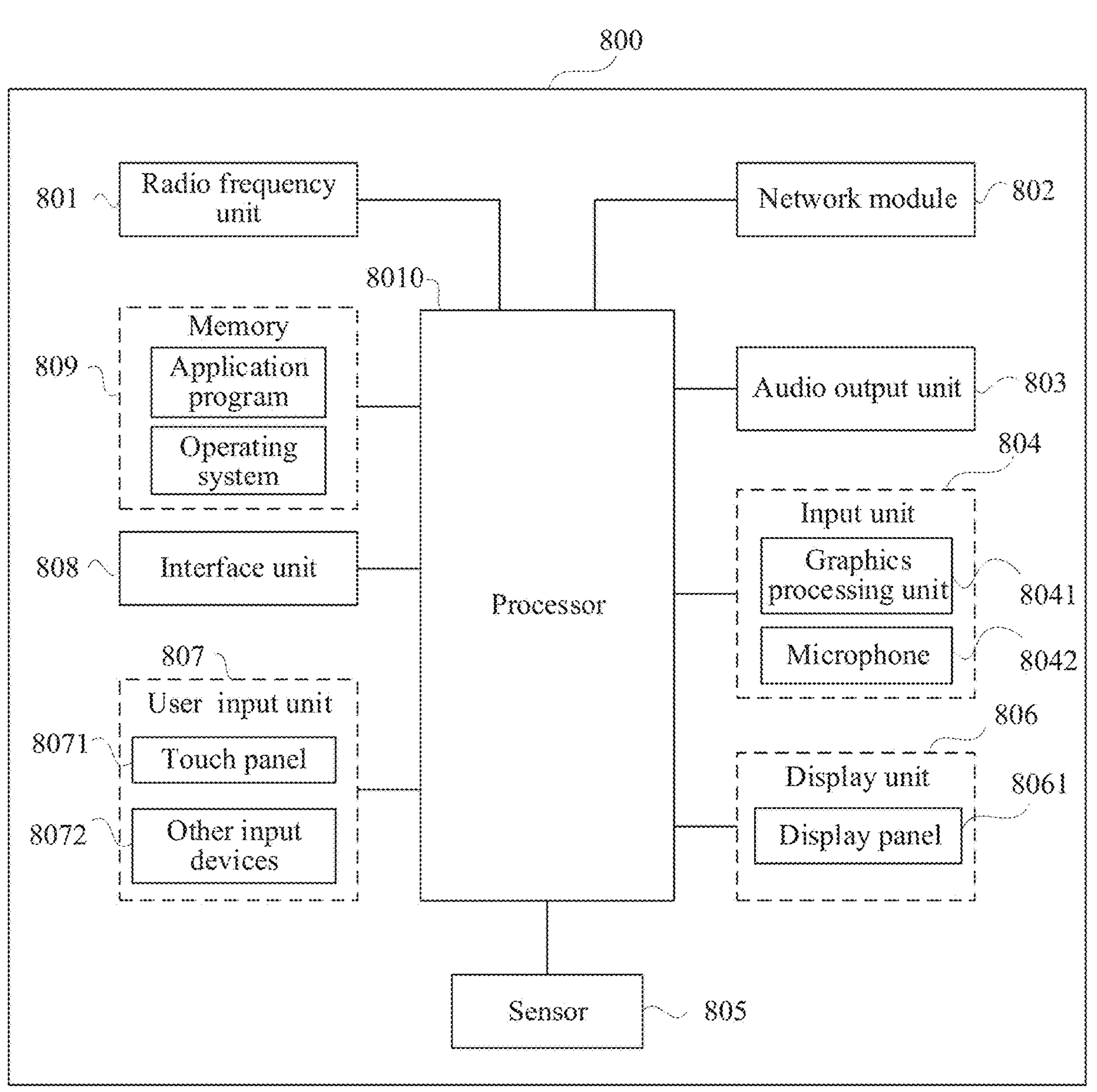
FIG. 8 is a schematic diagram of a hardware structure of an electronic device according to an embodiment of this application.

FIG. 8 is a schematic diagram of a hardware structure of an electronic device according to an embodiment of this application.

The electronic device 800 includes but is not limited to components such as a radio frequency unit 801, a network module 802, an audio output unit 803, an input unit 804, a sensor 805, a display unit 806, a user input unit 807, an interface unit 808, a memory 809, and a processor 8010.

A person skilled in the art can understand that the electronic device 800 may further include a power supply (for example, a battery) supplying power to all components, and the power supply may be logically connected to the processor 8010 through a power management system. In this way, functions such as charge management, discharge management, and power consumption management are implemented by using the power management system. The structure of the electronic device shown in FIG. 8 does not constitute any limitation on the electronic device. The electronic device may include more or fewer components than shown in the figure, or a combination of some components, or the components disposed differently. Details are not repeated herein.

The processor 8010 is configured to: in a case that a security information query request for querying a security status of the electronic device that is sent by a server is received by the REE side, obtain REE security status information and send the security information query request and the REE security status information to the TEE side;

obtain target security information from the TEE side and generate comprehensive security information based on the REE security status information and the target security information, where the target security information includes TEE security status information; and send the comprehensive security information to the server.

In this embodiment of this application, the REE security status information is collected on the REE side and the target security information is collected on the TEE side. The REE security status information and the target security information can be used to implement a comprehensive assessment on the security status of the electronic device, so that the security assessment result is more accurate. In addition, the system security is enhanced because the comprehensive security information is generated in the TEE environment.

Optionally, in a case that the security information query request includes an identifier of a client application program, before the collecting target security information, the method further includes:

verifying, on the TEE side based on the identifier of the client application program, whether the client application program has query permission; and the obtaining target security information includes:

obtaining the target security information if the client application program has query permission.

Optionally, in a case that the security information query request includes an identifier of a client application program and an authorization token, before the obtaining target security information, the method further includes:

verifying, on the TEE side based on the identifier of the client application program, whether the client application program has query permission, and verifying, on the TEE side, whether the authorization token is valid; and the obtaining target security information includes:

obtaining the target security information if the client application program has query permission and the authorization token is valid.

Optionally, the generating comprehensive security information based on the REE security status information and the target security information includes:

generating a security status assessment result of the electronic device based on the REE security status information and the TEE security status information; and generating the comprehensive security information based on the security status assessment result.

Optionally, the target security information further includes security capability information of the electronic device; and the generating the comprehensive security information based on the security status assessment result includes:

performing digital signature on the security capability information and the security status assessment result by using a private key of the electronic device; and generating the comprehensive security information based on the security capability information, the security status assessment result, and a signature.

Optionally, the processor 8010 is further configured to: in a case that security capability configuration information sent by a target server is received, perform configuration updating on a security capability of the electronic device according to the security capability configuration information; or in a case that security status assessment model configuration information sent by a target server is received, perform configuration updating on a security status assessment model of the electronic device according to the security status assessment model configuration information.

Optionally, the security capability information includes at least one of the following: trusted execution environment information, trusted user interaction information, hardware encryption and decryption information, security unit information, memory encryption information, anti-side channel attack information, and anti-fault injection attack information.

Optionally, the REE security status information and the TEE security status information each include at least one of the following: application access control information, file system access control information, data encryption information, data integrity protection information, security lock screen and authentication information, integrity verification information of device configuration files, whether there is malware or virus in a system, whether configuration of hardware and firmware has been tampered with, whether a system software version meets requirements, whether the system is rooted, whether a memory has been attacked, whether a kernel and kernel configuration have been tampered with, and whether a network connection is secure.

It can be understood that in this embodiment of this application, the input unit 804 may include a graphics processing unit (GPU) 8041 and a microphone 8042. The graphics processing unit 8041 processes image data of a still picture or video obtained by an image capture apparatus (such as a camera) in a video capture mode or an image capture mode. The display unit 806 may include a display panel 8061, and the display panel 8061 may be configured in a form of a liquid crystal display, an organic light-emitting diode, and the like. The user input unit 807 may include at least one of a touch panel 8071 and other input devices 8072. The touch panel 8071 is also referred to as a touchscreen. The touch panel 8071 may include two parts: a touch detection apparatus and a touch controller. The other input devices 8072 may include but are not limited to a physical keyboard, a function key (such as a volume control key or a power on/off key), a trackball, a mouse, a joystick, and the like. Details are not described herein.

The memory 809 may be configured to store software programs and various types of data. The memory 809 includes a first storage area for storing a program or instructions and a second storage area for storing data. The first storage area may store an operating system, an application program or instruction required by at least one function (for example, a sound playback function or an image playback function), and the like. In addition, the memory 809 may include a volatile memory or a non-volatile memory, or the memory 809 may include both a volatile memory and a non-volatile memory. The non-volatile memory may be a read-only memory (ROM), a programmable read only memory (PROM), an erasable programmable read-only memory (EPROM), and an electrically erasable programmable read-only memory (EEPROM), or flash memory. The volatile memory can be a random access memory (RAM), a static random access memory (SRAM), a dynamic random access memory (DRAM), a synchronous dynamic random access memory (SDRAM), a double data rate synchronous dynamic random access memory (DDRSDRAM), an enhanced synchronous dynamic random access memory (ESDRAM), a synchlink dynamic random access memory (SLDRAM), and a direct rambus random access memory (DRRAM). The memory 809 in the embodiments of this application includes but is not limited to these and any other suitable types of memories.

The processor 8010 may include one or more processing units. Optionally, an application processor and a modem processor may be integrated in the processor 8010. This application processor primarily processes operations involving an operating system, user interfaces, application programs, and the like. The modem processor primarily processes radio communication signals, for example, being a baseband processor. It can be understood that the modem processor may alternatively be not integrated in the processor 8010.

An embodiment of this application further provides a readable storage medium, where a program or instructions are stored in the readable storage medium. When the program or instructions are executed by a processor, the processes of the foregoing embodiment of the security assessment method can be implemented, with the same technical effects achieved. To avoid repetition, details are not described herein again.

The processor is a processor in the electronic device described in the foregoing embodiments. The readable storage medium includes a computer-readable storage medium, for example, a computer read only memory, a random access memory, a magnetic disk, or an optical disc.

An embodiment of this application further provides a chip, where the chip includes a processor and a communication interface. The communication interface is coupled to the processor, and the processor is configured to run a program or instructions to implement the processes of the foregoing security assessment method embodiments, with the same technical effects achieved. To avoid repetition, details are not described herein again.

It should be understood that the chip mentioned in the embodiments of this application may also be referred to as a system-level chip, a system chip, a chip system, a system-on-chip, or the like.

An embodiment of this application provides a computer program product, where the program product is stored in a storage medium, and the program product is executed by at least one processor to implement the processes of the foregoing security assessment method embodiments, with the same technical effects achieved. To avoid repetition, details are not repeated herein.

Persons of ordinary skill in the art may realize that units and algorithm steps of various examples described with reference to the embodiments disclosed in this specification can be implemented by using electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this disclosure.

It may be clearly understood by persons skilled in the art that, for the purpose of convenient and brief description, for a detailed working process of the foregoing system, apparatus, and unit, reference may be made to a corresponding process in the foregoing method embodiments, and details are not described again herein.

In the embodiments provided in this application, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communications connections may be implemented by using some interfaces. The indirect couplings or communications connections between apparatuses or units may be implemented in electrical, mechanical, or other forms.

Units described as separate components may or may not be physically separated. A component displayed as a unit may be one or more physical units, and may be located in one place, or may be distributed in a plurality of network elements. Some or all of the units may be selected based on actual requirements to achieve the objectives of the solutions of the embodiments.

In addition, functional units in the embodiments of this disclosure may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this disclosure essentially, or the part contributing to the prior art, or some of the technical solutions may be implemented in a form of a software product. The software product is stored in a storage medium, and includes several instructions for instructing a computer device (which may be a personal computer, a server, a network device, or the like) to perform all or some of the steps of the method described in the embodiments of this disclosure. The foregoing storage medium includes: any medium that can store program code, such as a USB flash drive, a removable hard disk, a ROM, a RAM, a magnetic disk, or an optical disc.

A person of ordinary skill in the art may understand that all or some of the processes of the methods in the embodiments may be implemented by a computer program controlling relevant hardware. The program may be stored in a computer readable storage medium. When the program runs, the processes of the method embodiments may be included.

The storage medium may include: a magnetic disk, an optical disc, a read-only memory (ROM), or a random access memory (RAM).

It should be noted that in this specification, the term "include", "comprise", or any of their variants are intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element. Furthermore, it should be noted that the scope of the methods and apparatuses in the embodiments of this application is not limited to performing the functions in the order shown or discussed, but may also include performing the functions in a substantially simultaneous manner or in a reverse order depending on the functions involved. For example, the described method may be performed in an order different from the order described, and steps may be added, omitted, or combined. In addition, features described with reference to some examples may be combined in other examples.

According to the description of the foregoing implementations, persons skilled in the art can clearly understand that the method in the foregoing embodiments may be implemented by software in combination with a necessary general hardware platform. Certainly, the method in the foregoing embodiments may alternatively be implemented by hardware. However, in many cases, the former is a preferred implementation. Based on such an understanding, the technical solutions of this application essentially or the part contributing to the prior art may be implemented in a form of a computer software product. The computer software product is stored in a storage medium (such as a ROM/RAM, a magnetic disk, or an optical disc), and includes several instructions for instructing a terminal (which may be a mobile phone, a computer, a server, a network device, or the like) to perform the methods described in the embodiments of this application.

The foregoing describes the embodiments of this application with reference to the accompanying drawings. However, this application is not limited to the foregoing specific implementations. These specific implementations are merely illustrative rather than restrictive. Inspired by this application, persons of ordinary skill in the art may develop many other forms without departing from the essence of this application and the protection scope of the claims, and all such forms shall fall within the protection scope of this application.

What is claimed is:

1. A security assessment method, applied to an electronic device that supports a trusted execution environment (TEE) and a rich execution environment (REE), wherein the method comprises:

in a case that a security information query request for querying a security status of the electronic device that is sent by a server is received by a REE side, obtaining REE security status information and sending the security information query request and the REE security status information to a TEE side;

obtaining target security information from the TEE side and generating comprehensive security information based on the REE security status information and the target security information, wherein the target security information comprises TEE security status information; and sending the comprehensive security information to the server.

2. The method according to claim 1, wherein in a case that the security information query request comprises an identifier of a client application program, before the obtaining target security information, the method further comprises:

verifying, on the TEE side based on the identifier of the client application program, whether the client application program has query permission; and the obtaining target security information comprises:

obtaining the target security information if the client application program has the query permission.

3. The method according to claim 1, wherein in a case that the security information query request comprises an identifier of a client application program and an authorization token, before the obtaining target security information, the method further comprises:

verifying, on the TEE side based on the identifier of the client application program, whether the client application program has query permission, and verifying, on the TEE side, whether the authorization token is valid; and the obtaining target security information comprises:

obtaining the target security information if the client application program has the query permission and the authorization token is valid.

4. The method according to claim 1, wherein the generating comprehensive security information based on the REE security status information and the target security information comprises:

generating a security status assessment result of the electronic device based on the REE security status information and the TEE security status information; and generating the comprehensive security information based on the security status assessment result.

5. The method according to claim 4, wherein the target security information further comprises security capability information of the electronic device; and the generating the comprehensive security information based on the security status assessment result comprises:

performing digital signature on the security capability information and the security status assessment result by using a private key of the electronic device; and generating the comprehensive security information based on the security capability information, the security status assessment result, and a signature.

6. The method according to claim 4, wherein the TEE side stores a security status assessment model, and the generating a security status assessment result of the electronic device based on the REE security status information and the TEE security status information comprises:

performing security status assessment on the REE security status information and the TEE security status information by using the security status assessment model, and generating the security status assessment result of the electronic device.

7. The method according to claim 1, further comprising:

in a case that security capability configuration information sent by a target server is received, performing configuration updating on a security capability of the electronic device according to the security capability configuration information; or in a case that security status assessment model configuration information sent by a target server is received, performing configuration updating on a security status assessment model of the electronic device according to the security status assessment model configuration information.

8. The method according to claim 5, wherein the security capability information comprises at least one of the following: trusted execution environment information, trusted user interaction information, hardware encryption and decryption information, security unit information, memory encryption information, anti-side channel attack information, or anti-fault injection attack information.

9. The method according to claim 1, wherein the REE security status information and the TEE security status information each comprise at least one of the following: application access control information, file system access control information, data encryption information, data integrity protection information, security lock screen and authentication information, integrity verification information of device configuration files, whether there is malware or virus in a system, whether configuration of hardware and firmware has been tampered with, whether a system software version meets requirements, whether the system is rooted, whether a memory has been attacked, whether a kernel and kernel configuration have been tampered with, or whether a network connection is secure.

10. A security assessment method, applied to a server, wherein the method comprises:

sending, to an electronic device, a security information query request for querying a security status of the electronic device;

receiving comprehensive security information sent by the electronic device, wherein the comprehensive security information is obtained based on rich execution environment (REE) security status information and trusted execution environment (TEE) security status information of the electronic device by the electronic device in response to the security information query request, and the comprehensive security information comprises a signature generated by the electronic device by using a private key;

verifying the signature in the comprehensive security information by using a public key paired with the private key; and if verification is successful, providing a target-service service to the electronic device.

11. An electronic device, comprising a processor and a memory, wherein the memory stores a program or instructions, the program or instructions, when executed by the processor, cause the electronic device to perform:

in a case that a security information query request for querying a security status of the electronic device that is sent by a server is received by a rich execution environment (REE) side, obtaining REE security status information and sending the security information query request and the REE security status information to a trusted execution environment (TEE) side;

obtaining target security information from the TEE side and generating comprehensive security information based on the REE security status information and the target security information, wherein the target security information comprises TEE security status information; and sending the comprehensive security information to the server.

12. The electronic device according to claim 11, wherein in a case that the security information query request comprises an identifier of a client application program, before obtaining target security information, the program or instructions, when executed by the processor, cause the electronic device to further perform:

verifying, on the TEE side based on the identifier of the client application program, whether the client application program has query permission; and when obtaining target security information, the program or instructions, when executed by the processor, cause the electronic device to perform:

obtaining the target security information if the client application program has the query permission.

13. The electronic device according to claim 11, wherein in a case that the security information query request comprises an identifier of a client application program and an authorization token, before obtaining target security information, the program or instructions, when executed by the processor, cause the electronic device to further perform:

verifying, on the TEE side based on the identifier of the client application program, whether the client application program has query permission, and verifying, on the TEE side, whether the authorization token is valid; and when obtaining target security information, the program or instructions, when executed by the processor, cause the electronic device to perform:

obtaining the target security information if the client application program has the query permission and the authorization token is valid.

14. The electronic device according to claim 11, wherein when generating comprehensive security information based on the REE security status information and the target security information, the program or instructions, when executed by the processor, cause the electronic device to perform:

generating a security status assessment result of the electronic device based on the REE security status information and the TEE security status information; and generating the comprehensive security information based on the security status assessment result.

15. The electronic device according to claim 14, wherein the target security information further comprises security capability information of the electronic device; wherein when generating the comprehensive security information based on the security status assessment result, the program or instructions, when executed by the processor, cause the electronic device to perform:

performing digital signature on the security capability information and the security status assessment result by using a private key of the electronic device; and generating the comprehensive security information based on the security capability information, the security status assessment result, and a signature.

16. The electronic device according to claim 14, wherein the TEE side stores a security status assessment model, wherein when generating a security status assessment result of the electronic device based on the REE security status information and the TEE security status information, the program or instructions, when executed by the processor, cause the electronic device to perform:

performing security status assessment on the REE security status information and the TEE security status information by using the security status assessment model, and generating the security status assessment result of the electronic device.

17. The electronic device according to claim 11, the program or instructions, when executed by the processor, cause the electronic device to further perform:

in a case that security capability configuration information sent by a target server is received, performing configuration updating on a security capability of the electronic device according to the security capability configuration information; or in a case that security status assessment model configuration information sent by a target server is received, performing configuration updating on a security status assessment model of the electronic device according to the security status assessment model configuration information.

18. The electronic device according to claim 15, wherein the security capability information comprises at least one of the following: trusted execution environment information, trusted user interaction information, hardware encryption and decryption information, security unit information, memory encryption information, anti-side channel attack information, or anti- fault injection attack information.

19. The electronic device according to claim 11, wherein the REE security status information and the TEE security status information each comprise at least one of the following: application access control information, file system access control information, data encryption information, data integrity protection information, security lock screen and authentication information, integrity verification information of device configuration files, whether there is malware or virus in a system, whether configuration of hardware and firmware has been tampered with, whether a system software version meets requirements, whether the system is rooted, whether a memory has been attacked, whether a kernel and kernel configuration have been tampered with, or whether a network connection is secure.

* * * * *